(12) United States Patent
Dumba et al.

(10) Patent No.: US 11,625,272 B2
(45) Date of Patent: Apr. 11, 2023

(54) SCALABLE OPERATORS FOR AUTOMATIC MANAGEMENT OF WORKLOADS IN HYBRID CLOUD ENVIRONMENTS

(71) Applicant: INTERNATIONAL BUSINESS MACHINES CORPORATION, Armonk, NY (US)

(72) Inventors: Braulio Gabriel Dumba, Elmsford, NY (US); Ubaid Ullah Hafeez, Yorktown Heights, NY (US); Abdulhamid Adebayo, Yorktown Heights, NY (US); Jun Duan, Mount Kisco, NY (US); Alexei Karve, Mohegan Lake, NY (US); Sai Zeng, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 343 days.

(21) Appl. No.: 16/994,586

(22) Filed: Aug. 15, 2020

(65) Prior Publication Data
US 2022/0050720 A1 Feb. 17, 2022

(51) Int. Cl.
*G06F 9/46* (2006.01)
*G06F 9/50* (2006.01)
(Continued)

(52) U.S. Cl.
CPC ........ *G06F 9/5011* (2013.01); *G06F 9/45558* (2013.01); *G06F 9/5083* (2013.01); *G06N 20/00* (2019.01); *G06F 2209/508* (2013.01)

(58) Field of Classification Search
CPC .. G06F 9/5011; G06F 9/45558; G06F 9/5083; G06F 2209/508
See application file for complete search history.

(56) References Cited

U.S. PATENT DOCUMENTS

| 9,727,332 B2 | 8/2017 | Kodali et al. |
| 9,967,159 B2 | 5/2018 | Shroff et al. |

(Continued)

FOREIGN PATENT DOCUMENTS

| CN | 104123189 A | 10/2014 |
| CN | 104657411 A | 5/2015 |

(Continued)

OTHER PUBLICATIONS

Mell, P. et al., "Recommendations of the National Institute of Standards and Technology"; NIST Special Publication 800-145 (2011); 7 pgs.

(Continued)

*Primary Examiner* — Gregory A Kessler
(74) *Attorney, Agent, or Firm* — Intelletek Law Group, PLLC; Gabriel Daniel, Esq.

(57) ABSTRACT

A computer-implemented method for managing one or more operations of a workload includes selecting a resource type for workload management on a platform. One or more operations of the selected resource to be managed are identified. A reconciliation time for execution of each of the identified operations is determined. A reconciliation period between two consecutive reconciliations is determined for each of the identified operations. A minimum number of processes for workload management of a given set of the operations on resources is calculated, and the determined minimum number of processes is deployed to manage the workload.

18 Claims, 10 Drawing Sheets

(51) Int. Cl.
*G06N 20/00* (2019.01)
*G06F 9/455* (2018.01)

(56) References Cited

U.S. PATENT DOCUMENTS

| | | |
|---|---|---|
| 10,250,451 B1 | 4/2019 | Moghe et al. |
| 10,291,488 B1 | 5/2019 | Srinivasan et al. |
| 10,447,806 B1 | 10/2019 | Sahay et al. |
| 2012/0204187 A1 | 8/2012 | Breiter et al. |
| 2019/0123973 A1 | 4/2019 | Jeuk et al. |
| 2019/0266534 A1 | 8/2019 | Kessaci |

FOREIGN PATENT DOCUMENTS

| | | |
|---|---|---|
| CN | 104035816 B | 3/2017 |
| KR | 10-2019-0076693 A | 7/2019 |

OTHER PUBLICATIONS

International Search Report and Written Opinion dated Nov. 11, 2021 in related application PCT/CN2021/112280, 9 pgs.

FIG 9

SCALABLE OPERATORS FOR AUTOMATIC MANAGEMENT OF WORKLOADS IN HYBRID CLOUD ENVIRONMENTS

BACKGROUND

Technical Field

The present disclosure generally relates to the deployment and management of computer resources, and more particularly, to workload management in hybrid cloud environments.

Description of the Related Art

There has been an increase in popularity of computer resources utilizing infrastructure and platforms spanning across a hybrid cloud environment. For example, there continues to be growth and increase in the use of virtual machines, as well as the use of application containers in which software code and all its dependencies are packaged or encapsulated. There continue to be challenges posed to providing easy deployment and management of resources in a hybrid cloud in the areas of security, lifecycle management, and operational needs.

In platforms such as Kubernetes, the use of components and tools can facilitate running applications in public and private clouds. As the complexity of multiple infrastructure/platforms such as a hybrid cloud increase, there is a need to ensure that both functional and non-functional requirements of such computer resources are met without expending excessive time and capital. Accordingly, there has been an increase in popularity of the use of operators to automate the monitoring of computer resources and facilitate the installation, update, and management of such resources because this approach decreases/eliminates concern about underlying platforms in cloud-services.

However, while the use of operators (such as a Kubernetes operator) can observe a current state of a resource (of a plurality of resources) and remediate a deviation between a desired state and an actual state of the resource, there is a limit to the number of resources that can be monitored. For example, the implementation of an operator for each distinct resource in the workload increases the costs of maintenance, as each operator should be managed. There is also increased operator idle time by implementing an operator for each distinct resource in the workload. An operator can manage multiple resources, but due to the sequential nature of application state reconciliation job execution, each operator can only monitor a limited number of resources and meet the resource requirements. For example, in a hybrid cloud environment, hybrid workloads pose a challenge for operator applications in terms of capability and costs. Thus, there is a need to enhance workload management, particularly as users are migrating operations to a container environment.

SUMMARY

According to one embodiment, a computer-implemented method for managing one or more operations of a workload in a hybrid cloud environment includes selecting a resource type from a plurality of resources for workload management on a platform. One or more operations to be managed are identified on the platform. A reconciliation execution time is determined for each of the operations to be managed, and a reconciliation period is determined for each operation. A minimum number of processes for management of a given set of operations on resources are determined and processes are deployed to manage the workload. The management of heterogeneous resources (e.g. different types of workloads) can be provided by the single computer-implemented method, which provides increased computer efficiency and enhanced workload management functionality.

In one embodiment, selecting the resource type includes selecting one of a bare-metal resource, a container resource, or a virtual machine resource to manage the workload. As hybrid cloud environments will have various types of resources and there is a desire to migrate toward container operations, there is improved functionality by the computer-implemented method of being capable of managing different types of resources.

In one embodiment, identifying the one or more operations includes identifying at least one of a patching operation, an event managing operation, or a compliance operation. Such varied operations can all be managed with a single computer-implemented method.

In one embodiment, the computer-implemented method includes using machine learning to determine the reconciliation execution time over multiple executions of each of the identified operations.

In one embodiment, the computer-implemented method includes using machine learning to determine the reconciliation period of each of the identified operations, and the reconciliation execution time.

In one embodiment, deploying the determined minimum number of processes to perform workload management includes programmatically mapping operations to operators.

In one embodiment, a computing device for managing one or more operations of a workload in a hybrid cloud environment includes a processor and a memory coupled to the processor. The memory stores instructions to cause the processor to perform acts including selecting a resource type from a plurality of resources for workload management on a cloud-based platform. One or more operations of the selected resource type to be managed are identified. A reconciliation execution time is determined for execution of each of the identified operations. A reconciliation period between two consecutive reconciliations for each of the identified operations is determined. A minimum number of processes for workload management of a given set of the identified operations on the selected resource type is computed, and the determined minimum number of processes is deployed to perform workload management.

In one embodiment, a machine-readable medium is configured with computer-readable program code having computer-readable instructions that, when executed, causes a computer device to perform a method for managing one or more operations of a workload in a hybrid cloud environment.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition to or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 1A is a diagram providing an overview of an architecture of hybrid workloads, consistent with an illustrative embodiment.

DETAILED DESCRIPTION

Overview

In the following detailed description, numerous specific details are set forth by way of examples to provide a thorough understanding of the relevant teachings. However, it should be understood that the present teachings may be practiced without such details. In other instances, well-known methods, procedures, components, and/or circuitry have been described at a relatively high-level, without detail, to avoid unnecessarily obscuring aspects of the present teachings.

In some illustrative embodiments, a Kubernetes operator is used. However, it is to be understood that the present disclosure is not limited to the use of Kubernetes operators. A Kubernetes operator is an application deployment method that enhances a Kubernetes platform to manage complex workloads such as, for example, distributed systems that use quorum mechanisms and databases. Kubernetes operators facilitate automated deployment, scaling, and operating application containers so that an entity can define how applications are run and interact with each other. A scalable Kubernetes system can provide, for example, an expansion of the contents (e.g., scaling) and isolation between items that permits removal of any item without affecting the other contents. The determined minimum number of processes to perform workload management includes programmatically mapping the identified operations to scalable Kubernetes operators.

The computer-implemented system and method provide for an improvement in the efficiency of computer operations. For example, by virtue of the teachings herein, the improvement in managing workloads includes that a single management tool can provide for the managing of a heterogeneous group of resources (e.g., bare-bones, container, virtual machine) in a hybrid cloud environment plurality with a minimum number of operators (including but not limited to Kubernetes operators) resulting in a reduction in the amount of processing power, as well as a reduction in the use of computer memory.

Example Architecture

Figure 1A:
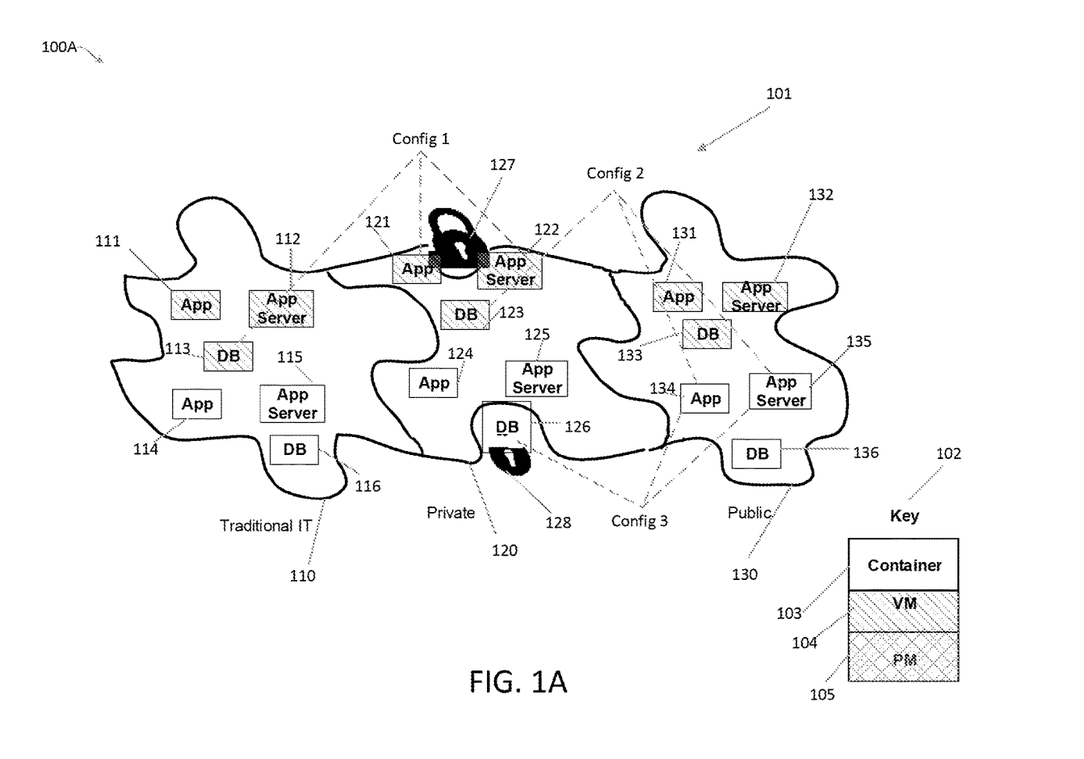

FIG. 1A is diagram 100A providing an overview of an architecture of hybrid workloads, consistent with an illustrative embodiment. The hybrid workloads can span multiple dimensions and may include, for example, a multi-cloud/Multi OS, one or more types of cloud deployment models (traditional, private, public cloud), and/or a type of deployment (bare metal, vm, container, external service), etc. It is to be understood that hybrid clouds combine on-premises infrastructure/platforms (e.g., private clouds) with public clouds. In some embodiments, there is a discussion of Kubernetes operators being deployed in a private infrastructure or a public cloud, but the disclosure is not limited to such deployment, nor limited to Kubernetes operators.

For example, in FIG. 1A there is shown a hybrid workload resource type 101 including a traditional Information Technology (IT) resource 110, a private resource 120, and a public resource 130. The key 102 shows shadings used in configurations shown in the hybrid workload resource type that may include a container 103, a virtual machine (VM) 104 and a physical machine (PM) 105. It is to be understood that the arrangement shown in FIG. 1A is provided for illustrative purposes and the disclosure is not limited to the illustrated embodiment shown and described herein.

With reference to the shadings identified by the key 102 in FIG. 1A, the hybrid workload resource type in the traditional IT 110 resource can include an application 111, an application server 112, and a database 113 configured as virtual machine (VM) resources. In addition, the traditional IT resource 110 shown also includes an application 114, an application server 115, and a database 116 configured as container resources. The dashed lines in FIG. 1A show particular groupings of an application, an application server, and a database that include items from more than one resource, and are labeled as configuration 1, configuration 2 and configuration 3. For example, configuration 1 includes the application 121 and the application server 122 from the private resource 120, and the database 113 from the traditional IT source 110. Configuration 2 includes an application 134 and an application server 135 from the public resource 130, and a database 123 from the private resource 120. Configuration 3 includes the application 134 and the application server 135 from the public resource 130, and a database 126 from the private resource 120.

The private resource 120 shown includes, for example, an application 121, an application server 122, and a database (DB) 123 configured as VM resources. In addition, an application 124 and an application server 125 are shown, along with a database 126. As symbolized by the locks 127, 128, the access to the applications 121, 124, the databases 123, 126, and the application servers 122, 125 are restricted.

The public resource 130 includes, for example, an application 131, the application server 132, and the database 133 configured for VM, and the application 134, the application server 135, and the database 136 are configured for a container resource.

Figure 1B:
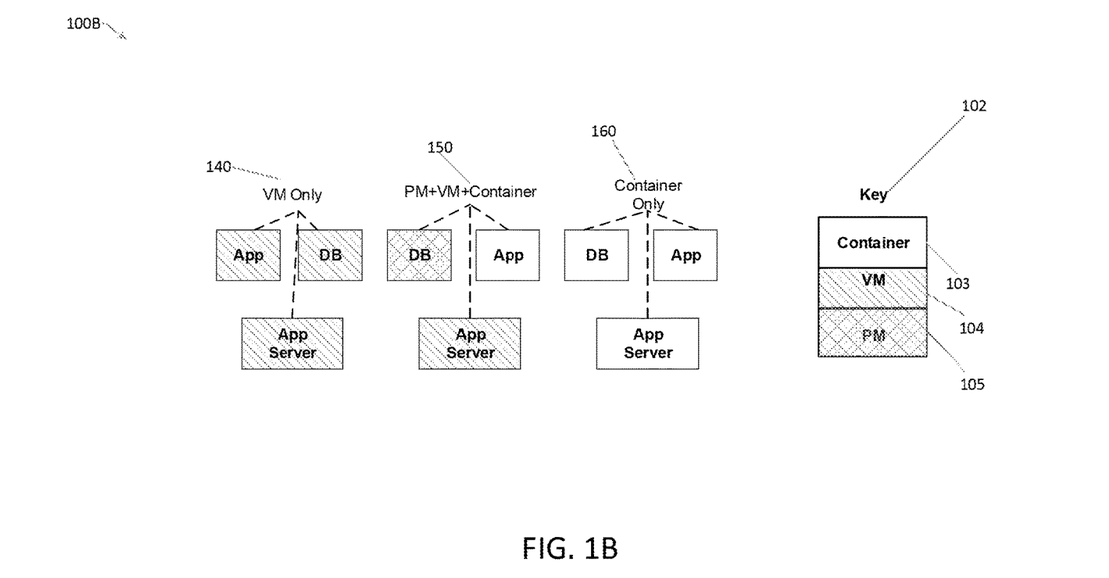
FIG. 1B shows more detail of the configurations of resources used for a hybrid workload resource type shown in FIG. 1A, consistent with an illustrative embodiment.

FIG. 1B shows more detail of the different configurations of resources used for a hybrid workload resource type 101 shown in FIG. 1A. The configurations shown in FIG. 1B correspond to the configurations 1, 2, and 3 identified in FIG. 1A by the dotted lines. The key 102 from FIG. 1A is shown again in FIG. 1B to facilitate the explanation of FIG. 1B. For example, the configurations shown in FIG. 1B are VM 140 only, a physical machine (PM)+VM+Container 150, or a container 160 only. It is to be understood that the configurations shown in FIG. 1B are non-exhaustive of the breadth of the disclosure.

Figure 2:
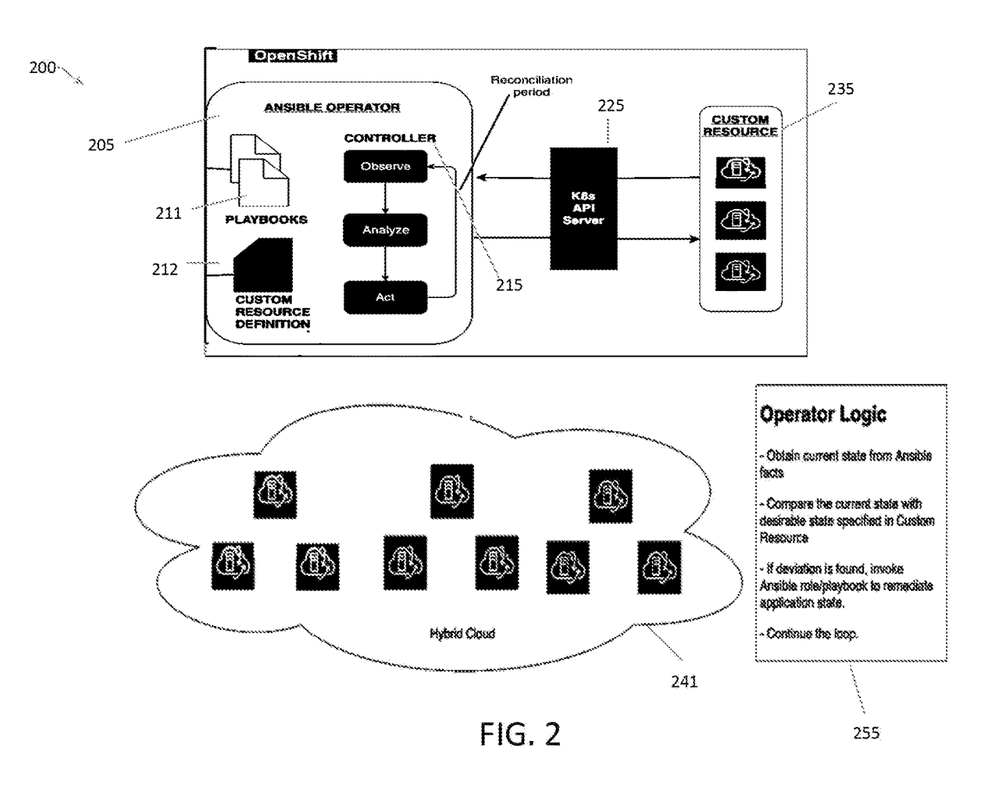
FIG. 2 illustrates an operation of managing of resources using an operator, consistent with an illustrative embodiment.

FIG. 2 illustrates the managing of resources 200 for a hybrid cloud 241 using an operator 205, (such as an Ansible® operator), consistent with an illustrative embodiment. The operator 205 includes a controller 215 configured to observe, analyze, and act with regard to resources. An API server 225, such as a Kubernetes "K8" API server, is shown in communication with both the operator 205 and a custom resource 235. A custom resource 235 is an object of a custom resource definition 212. For example, the operator 205 processes resources according to the custom resource definition 212. When a minimum number of processes (e.g., Kubernetes operators) is determined to provide a desired (e.g., optimal) management of a given set of operations on resources, there are mapping operations performed of operation types to the custom resource definitions 212, as well as to the custom resources 235. The operation types can include compliance (e.g., file permissions and password complexity), patching (e.g., service patch and service pack), event management (e.g., low disk space and low free memory space), and deployment/change (e.g., DB upgrade, filesystem expansion). Tables can be used to map the operation types to the custom resources 235. A regrouping of the custom resources 235 can be performed based on changes to a workload. The operator 205 is configured with at least the functionality shown in the table 255, so that the operator 205 can obtain a current state of an application, and compare the current state with a desired state in the custom resource 235. When a deviation is found, a playbook 211 can be invoked to remediate the application state. It is to be understood that the present disclosure is not limited to the configuration shown and described in FIG. 2. For example, the API server 225 is not limited to a K8 API server.

Figure 3:
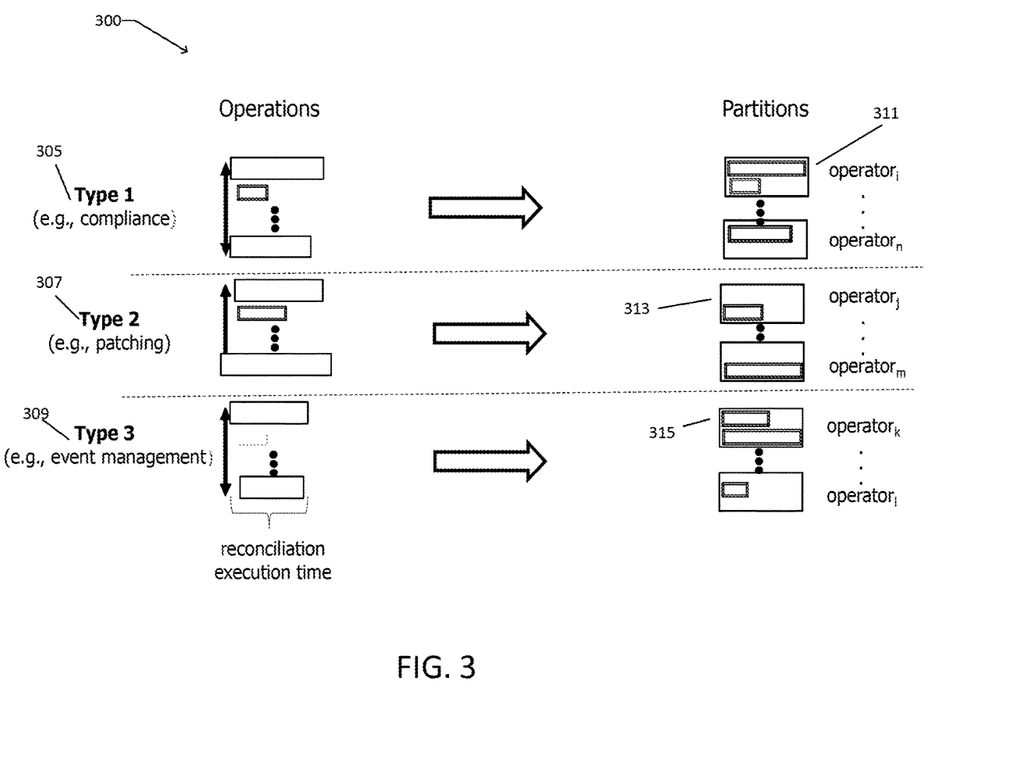
FIG. 3 illustrates a design and a framework for managing a workload in a hybrid cloud environment, consistent with an illustrative embodiment.

FIG. 3 illustrates a design and framework 300 for managing a workload in a hybrid cloud environment, consistent with an illustrative embodiment. The operations of a particular resource type selected for workload management are identified. Some non-exhaustive examples of operations of a particular resource type are discussed herein below.

For example, as shown in the non-limiting examples of FIG. 3, operations can include a compliance operation 305, a patching operation 307, and/or an event management operation 309. Compliance operations 305 may include functions and rules ranging from password complexity to file permissions. A patching operation 307 may include, for example, operations ranging from the application of security patches to the installation and update of service packs. An event management operation 309 may include functions being monitored, such as low memory conditions, low disk space, etc. The event management operation(s) 309 can include determining of workload dimensions of one or more identified operations of a resource type selected for workload management. For example, the determination of a reconciliation time for the execution of operations and a reconciliation period can be based on workload lifecycle data, user requirements, etc., and can be updated by machine learning. The operations 305, 307, 309 are provided as respective partitions 311, 313, 315 that are used to deploy a determined minimum number of processes (e.g., Kubernetes operators) to perform workload management.

Figure 4:
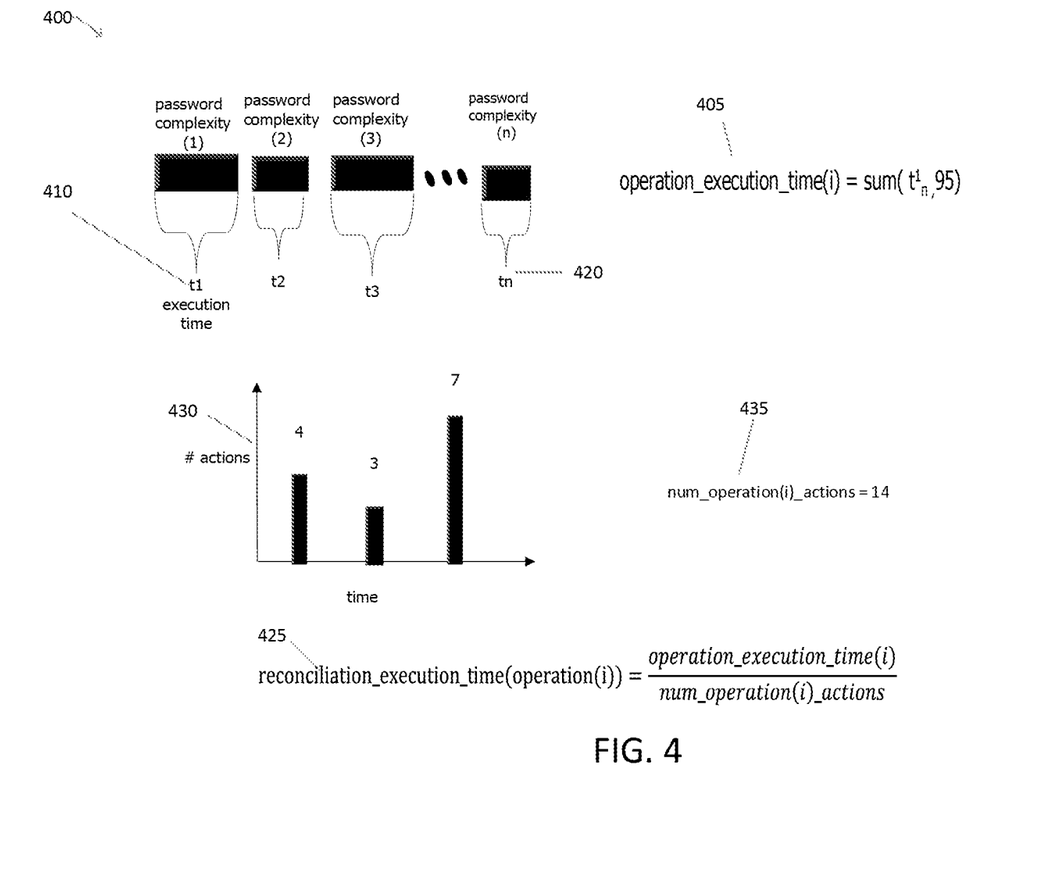
FIG. 4 illustrates the computing of the reconciliation period and an execution time, consistent with an illustrative embodiment.

FIG. 4 is an illustration 400 of the computing of the reconciliation period and a reconciliation execution time, consistent with an illustrative embodiment. The reconciliation period can be based on user requirements, such as empirical experience, or can be data-driven from past workload lifecycles (e.g., historical execution). The reconciliation period provides information regarding how often to monitor certain operations. A reconciliation period may be determined as a period between two consecutive reconciliations for each of the identified operations selected for workload management. For example, with regard to the operations shown in FIG. 3, compliance operations 305 can have, for example, a reconciliation period of 2 hours. Patching operations 307 can have a weekly reconciliation period, whereas event management 309 can have an on-demand reconciliation period. It is to be understood that the aforementioned reconciliation periods are illustrative examples and there is no limitation based on the examples of reconciliation periods.

With continued reference to FIG. 4, a total operation execution time 405 is shown by computing a sum of a plurality of execution times t1 410 to tn 420. Although FIG. 4 shows password complexity functions are being executed (e.g., a compliance operation 305 shown in FIG. 3), the operation execution time can be determined for any of the other operations as shown in FIG. 4. A graph 430 of the number of actions performed versus time is shown. As illustrated in FIG. 4, the computed number of operation actions (e.g., for patching: security patch, service pack; for compliance: password complexity, file permissions; and for event management: low memory, low disk) is 14 (e.g., 4+3+7 as shown). Accordingly, the reconciliation execution time 425 can be determined as being equal to the operation execution time 405 divided by the total number of operation actions.

With regard to computing the reconciliation period and the reconciliation execution time 425, machine learning may be used to determine/predict the reconciliation execution time 425 over multiple executions of the identified operations. Machine learning can also be used to determine/predict the reconciliation period of each of the identified operations. Training data, such as lifecycle workload (historical execution) may be used, and updated with additional workload information as subsequent executions occur. The determination of the reconciliation period and reconciliation execution time operations can be repeated as new operation information is provided, or at predetermined intervals, so that machine learning can determine the reconciliation execution time and/or the reconciliation period over multiple executions of the identified operations with increased accuracy. It is to be understood that FIG. 4 is provided for illustrative purposes, and the determining of the reconciliation period and reconciliation execution time is not limited to the operations illustrated in FIG. 4.

Figure 5:
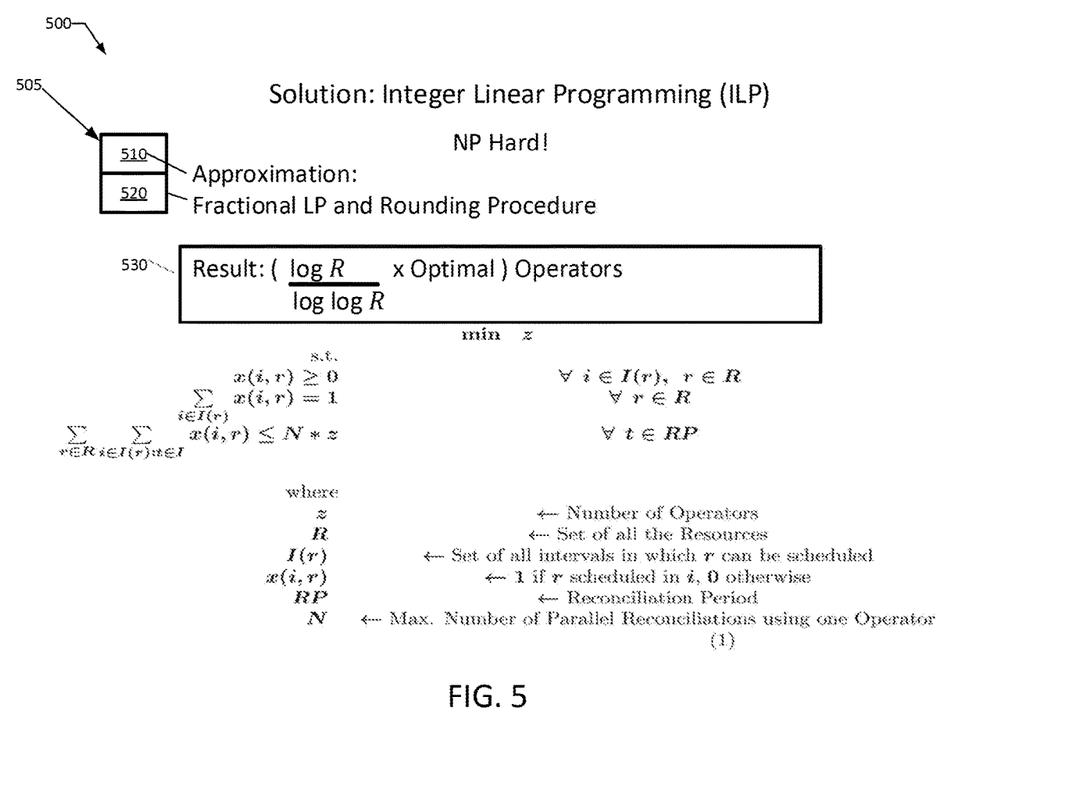
FIG. 5 shows an example of using integer linear programming, consistent with an illustrative embodiment.

FIG. 5 shows an example of determining a group operation 500 using integer linear programming (ILP), consistent with an illustrative embodiment. A modeling is performed to find the most efficient possible allocation of grouped operators. In this case, the consideration of costs can refer to the efficiency of computer operations. One way to determine group operations is to treat each operation as a single entry and its costs will be the estimated reconciliation execution time. A salient consideration is that given a set of operations, each having a reconciliation cost, how to group the set of operations across a minimum number of operators. Through the use of (ILP) using an approximation 510, and performing a fractional LP and rounding procedure 520 that results 530 show as a computed number of operators (min z) subject to (e.g., such that) the conditions including a set of all the resources, a set of all intervals in which a resource can be scheduled, the reconciliation period, and the maximum number parallel reconciliations using one operator. Other approaches, such as Greedy Assignment/GA, can be used to calculate a minimum number of operators. In the use of ILP, the problem provides an integer solution to the number of operators. Non-deterministic polynomial-time (NP) class problems don't have a polynomial run-time to solve, but have a polynomial run-time to verify solutions. NP-hardness is the defining property of a class of problems that are at least as hard as the hardest problems in NP. ILP problems are NP-hard and have exponential worst-case complexity. Given an input of r∈R operations associated with a reconciliation period (RP) and reconciliation time/cost (RC). This algorithm schedules all operations, while minimizing the number of operators used (z). A time interval i∈I(r) of length RC during which the operation r will be executed is selected. For each operation r∈R, there is an indicator variable x to identify if an operation r can be scheduled on the time interval i. Each operation is scheduled on at least one interval and the total number of operations scheduled at time t is at most z. For each operator, the set of operations assigned to it are executed in disjoint intervals.

Example Process

With the foregoing overview of the example architecture, it may be helpful now to consider a high-level discussion of an example process. To that end, in conjunction with FIGS. 2, 3 and 4, FIG. 6 depicts a flowchart 600 of a computer-implemented method of managing one or more operations of a workload in a hybrid cloud environment, consistent with an illustrative embodiment.

Figure 6:
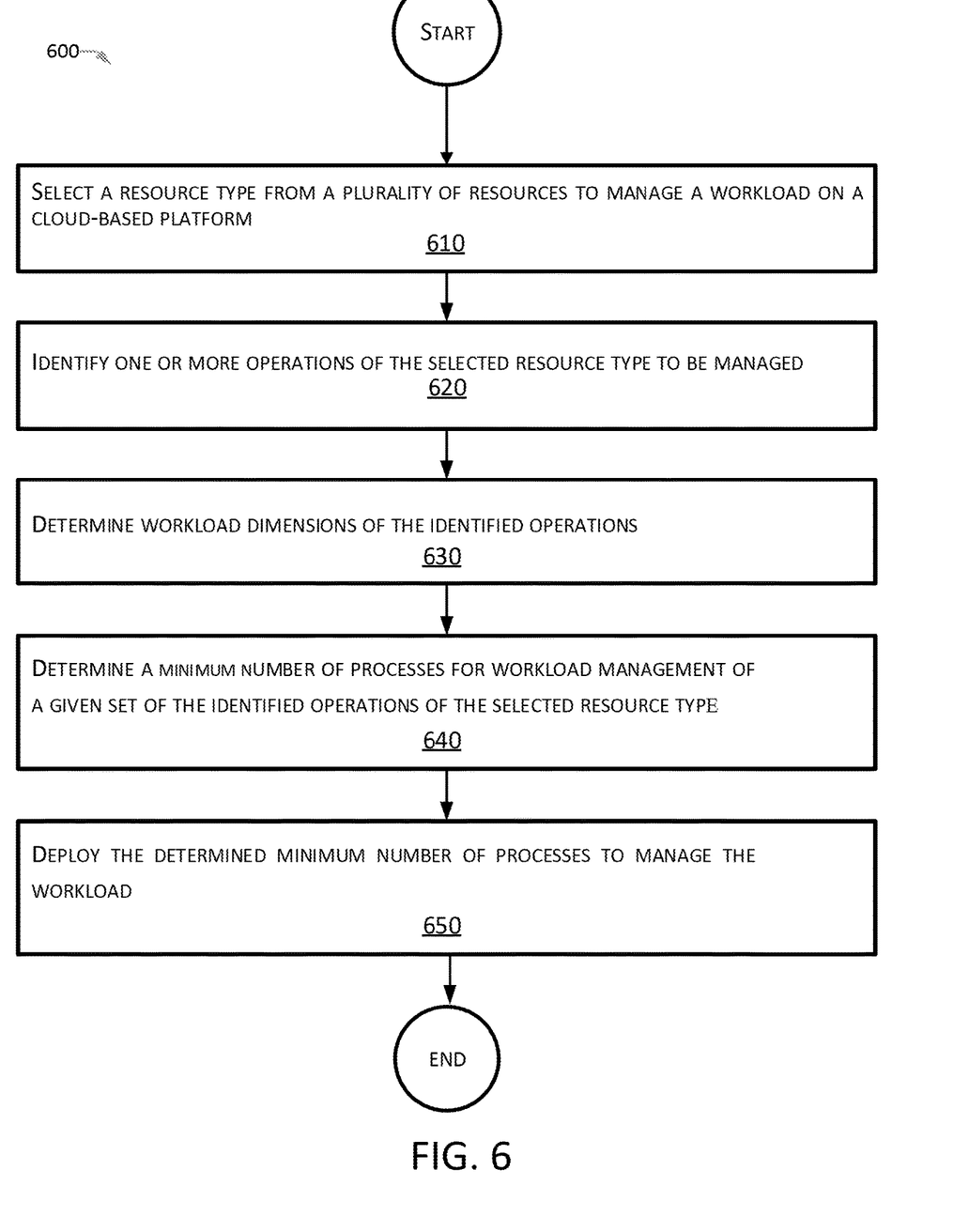
FIG. 6 depicts a flowchart of a method of managing one or more operations of a workload in a hybrid cloud environment, consistent with an illustrative embodiment.

At operation 610, a resource type from a plurality of resources is selected for workload management on a cloud-based platform. There are many different resource types that can be selected, such as a bare-metal resource, a virtual machine resource, or a container resource. In a hybrid cloud environment, there are often multiple types of resources and this computer-implemented method can provide workload management for a plurality of the resources.

At operation 620, one or more operations of the selected resource type to be managed are identified. As shown in FIG. 3, some non-limiting examples of operations include a compliance operation 305, a patching operation 307, or an event management operation 309. As discussed herein above, FIG. 3 illustrates these operations may be provided as partitions that are used to deploy a determined minimum number of processes (e.g., Kubernetes operators) to perform workload management.

At operation 630, workload dimensions of the identified one or more operations are determined. FIG. 4 and its description herein above provide examples of workload dimensions, such as the reconciliation period and the reconciliation execution time. The reconciliation period can be set by empirical experience, user needs, and/or data-driven from past workload lifecycle(s) (historical execution). The reconciliation execution time can be computed as shown in FIG. 4. The workload dimension can be learned and updated by machine learning. For example, the machine learning can be supervised or unsupervised. In the case of supervised machine learning, historical execution data can be labeled as a training set.

At operation 640, a minimum number of processes can be determined for workload management of a given set of the identified operations of the selected resource type. As shown in FIG. 5, one way to determine the minimum number of processes is through the use of ILP. In conjunction with the description of FIG. 2 herein above, operation types can be mapped to custom resource definitions (CRDs) that apply to custom resources. Based on changes to the workload, the custom resources may be regrouped. The ILP is a formulation of the problem, a modeling can be performed to compute a more efficient, or the most efficient, grouping of operations.

At step 650, the determined minimum number of processes to perform workload management is deployed. The deploying of the determined minimum number of processes to perform workload management can include programmatically mapping the identified operations to operators. The operators may be Kubernetes operators and they can be scalable to the workload. Although the process ends at operation 650, machine learning can be performed to learn and/or update the determined workload dimensions such as the reconciliation period and the reconciliation execution time over multiple execution steps.

Figure 7:
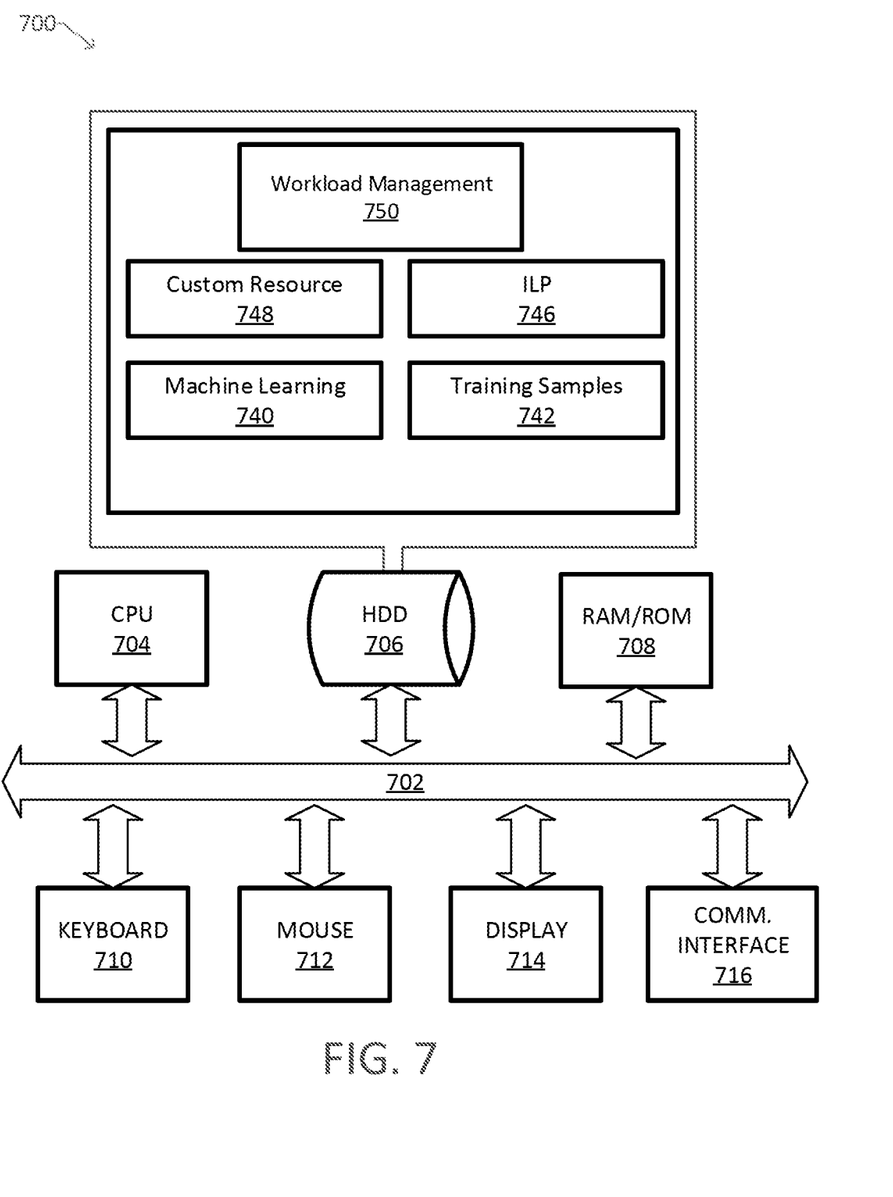
FIG. 7 is a functional block diagram illustration of a computer hardware platform that can communicate with various networked components, consistent with an illustrative embodiment.

FIG. 7 provides a functional block diagram illustration 700 of a computer hardware platform. In particular, FIG. 7 illustrates a particularly configured network or host computer platform 700, as may be used to implement the method shown in FIG. 6.

The computer platform 700 may include a central processing unit (CPU) 704, a hard disk drive (HDD) 706, random access memory (RAM) and/or read-only memory (ROM) 708, a keyboard 710, a mouse 712, a display 714, and a communication interface 716, which are connected to a system bus 702. The HDD 706 can include data stores.

In one embodiment, the HDD 706, has capabilities that include storing a program that can execute various processes, such as for executing a workload management module 750, in a manner described herein. The workload management module 750 provides overall management of the selected workload. A custom resource module 748 monitors a state description of resources, and an ILP module 746 provides a modeling function for determining a group of operations. A machine learning module 740 and training samples 742 can be used to increase the accuracy of the determined reconciliation time and reconciliation period. There can be various modules configured to perform different functions that can vary in quantity.

For example, the training sample module 742 stores various data to train the processor with a machine learning module 740 configured to perform machine learning regarding workload management including determining reconciliation time and reconciliation periods for each of identified operations as discussed herein above.

In one embodiment, a program, such as Apache™, can be stored for operating the system as a Web server. In one embodiment, the HDD 706 can store an executing application that includes one or more library software modules, such as those for the Java™ Runtime Environment program for realizing a JVM (Java™ virtual machine).

Example Cloud Platform

As discussed above, functions relating to environmental and ecological optimization methods may include a cloud. It is to be understood that although this disclosure includes a detailed description of cloud computing as discussed hereinbelow, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 8:
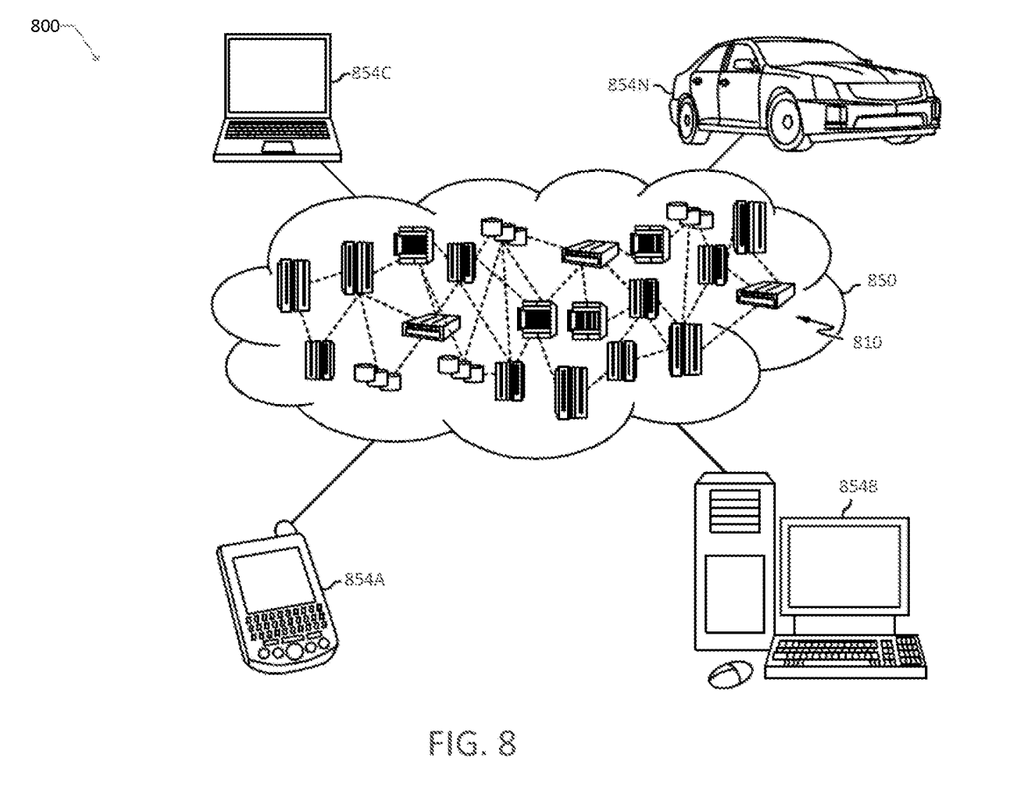
FIG. 8 depicts an illustrative cloud computing environment utilizing cloud computing.

Referring now to FIG. 8, an illustrative cloud computing environment 800 utilizing cloud computing is depicted. As shown, cloud computing environment 800 includes cloud 800 having one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 800 to offer infrastructure, platforms, and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
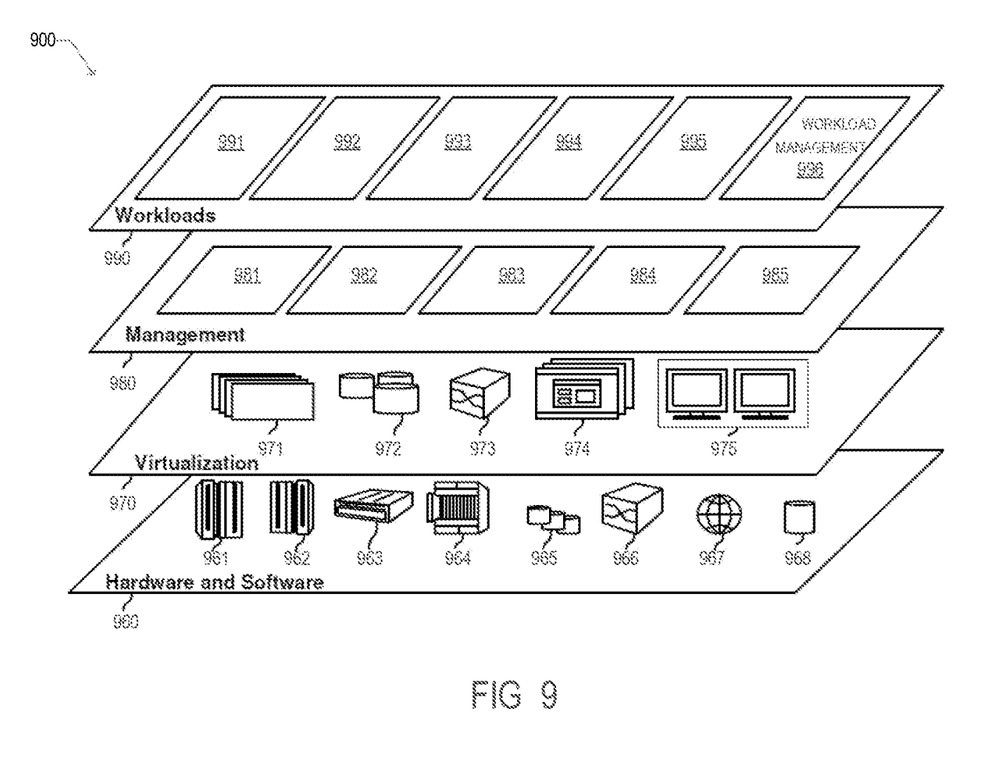
FIG. 9 depicts a set of functional abstraction layers provided by a cloud computing environment.

Referring now to FIG. 9, a set of functional abstraction layers 900 provided by cloud computing environment 800 (FIG. 8) is shown. It should be understood in advance that the components, layers, and functions shown in FIG. 9 are intended to be illustrative only and embodiments of the disclosure are not limited thereto. As depicted, the following layers and corresponding functions are provided:

Hardware and software layer 960 include hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and a workload management module 996 to perform workload management on a hybrid cloud-based platform, as discussed herein.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart, and diagrams in the figures herein illustrate the architecture, functionality, and operation of possible implementations according to various embodiments of the present disclosure.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any such actual relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method for managing one or more operations of a workload in a platform, the method comprising:

selecting a resource type to manage the workload on the platform;

identifying one or more operations of the selected resource type to be managed;

determining workload dimensions of the identified one or more operations;

determining a minimum number of processes to manage a given set of the identified operations of the selected resource type of the workload;

using machine learning to determine a reconciliation execution time over multiple executions of each of the identified operations; and deploying the determined minimum number of processes to manage the workload.

2. The computer-implemented method according to claim 1, wherein determining the workload dimensions comprises:

determining a reconciliation time for execution of each of the identified operations; and determining a reconciliation period between two consecutive reconciliations for each of the identified operations.

3. The computer-implemented method according to claim 1, wherein selecting the resource type comprises selecting one or more of a bare-metal resource, a container resource, or a virtual machine resource for the management of the workload.

4. The computer-implemented method according to claim 1, wherein the identifying of one or more operations include identifying at least one of a patching operation, an event managing operation, or a compliance operation.

5. The computer-implemented method according to claim 1, further comprising using machine learning to determine a reconciliation period of each of the identified operations.

6. The computer-implemented method according to claim 1, wherein deploying the determined minimum number of processes to perform the management of the workload includes programmatically mapping the identified operations to operators.

7. The computer-implemented method according to claim 1, wherein deploying the determined minimum number of processes to perform the management of workload includes programmatically mapping the identified operations to scalable Kubernetes operators.

8. A computing device for managing one or more operations of a workload in a platform, comprising:

a processor;

a memory coupled to the processor, the memory storing instructions to cause the processor to perform acts comprising:

selecting a resource type from a plurality of resources to manage a workload on the platform;

identifying one or more operations of the selected resource type to be managed;

determining a reconciliation time for execution of each of the identified operations;

determining a reconciliation period between two consecutive reconciliations for each of the identified operations;

determining a minimum number of processes to manage a given set of the identified operations on the selected resource type of the workload;

performing machine learning to determine a reconciliation period of each of the identified operations; and deploying the determined minimum number of processes to manage the workload.

9. The computing device according to claim 8, wherein the instructions cause the processor to perform an additional act, comprising performing machine learning to determine a reconciliation execution time over multiple executions of each of the identified operations.

10. The computing device according to claim 8, wherein the plurality of resource types include a bare-metal, a container, or a virtual machine, and wherein the processor is configured to perform workload management on each of the plurality of resource types selected.

11. The computing device according to claim 8, wherein deploying the determined minimum number of processes to perform the management of the workload includes programmatically mapping the identified operations to scalable Kubernetes operators.

12. The computing device according to claim 8, wherein the identified operations include one or more of a compliance operation, a patching operation, an event management operation, or a deployment operation.

13. A non-transitory computer-readable storage medium tangibly embodying a computer-readable program code having computer-readable instructions that, when executed, causes a computer device to perform a method of managing one or more operations of a workload in a platform, the method comprising:

selecting a resource type from a plurality of resources to manage the workload on the platform;

identifying one or more operations of the selected resource type to be managed;

determining a reconciliation time for execution of each of the identified operations;

determining a reconciliation period between two consecutive reconciliations for each of the identified operations;

determining a minimum number of processes to manage a given set of the identified operations on the selected resource type of the workload;

using machine learning to determine the reconciliation execution time over multiple executions of each of the identified operations; and deploying the determined minimum number of processes to manage the workload.

14. The computer-readable storage medium according to claim 13, wherein selecting the resource type comprises selecting one of a bare-metal resource, a container resource, or a virtual machine resource for workload management.

15. The computer-readable storage medium according to claim 13, wherein the identifying of one or more operations include identifying at least one of a patching operation, an event managing operation, or a compliance operation.

16. The computer-readable storage medium according to claim 13, further comprising using machine learning to determine the reconciliation period of each of the identified operations.

17. The computer-readable storage medium according to claim 16, wherein the identified operations include one or more of a compliance operation, a patching operation, an event management operation, or a deployment operation.

18. The computer-readable storage medium according to claim 13, wherein deploying the determined minimum number of processes to perform workload management includes programmatically mapping the identified operations to operators.

* * * * *